US012233664B2

(12) United States Patent
Hogan

(10) Patent No.: US 12,233,664 B2
(45) Date of Patent: Feb. 25, 2025

(54) STROBE SPIN ART

(71) Applicant: John Dennis Hogan, Livermore, CA (US)

(72) Inventor: John Dennis Hogan, Livermore, CA (US)

( * ) Notice: Subject to any disclaimer, the term of this patent is extended or adjusted under 35 U.S.C. 154(b) by 299 days.

(21) Appl. No.: 17/318,308

(22) Filed: May 12, 2021

(65) Prior Publication Data

US 2021/0347201 A1 Nov. 11, 2021

(51) Int. Cl.

*B44D 3/22* (2006.01)
*B05D 1/00* (2006.01)
*B05D 3/06* (2006.01)
*H05B 41/34* (2006.01)
*H05B 47/10* (2020.01)

(52) U.S. Cl.

CPC ............... *B44D 3/22* (2013.01); *B05D 1/005* (2013.01); *B05D 3/067* (2013.01); *H05B 41/34* (2013.01); *H05B 47/10* (2020.01)

(58) Field of Classification Search

CPC .......... G09B 11/10; B44D 3/22; H05B 41/34; H05B 47/10; B05C 11/08; B05D 1/005; B05D 3/067; B05D 1/002; B05D 5/06

USPC ....................................... 434/81–105; 118/52

See application file for complete search history.

(56) References Cited

U.S. PATENT DOCUMENTS 3,280,792 A * 10/1966 Heyde ...................... B44D 3/22 434/84
3,373,717 A * 3/1968 Morales .................. B44D 3/22 118/52
3,617,337 A * 11/1971 Presley .................... B44D 2/00 427/280
4,550,679 A * 11/1985 Pipa ......................... B44D 3/22 434/84
4,893,583 A * 1/1990 Jaffa ....................... B05C 13/00 434/84
5,157,485 A * 10/1992 Howitt ..................... H04N 7/18 348/61
5,672,057 A * 9/1997 Engel ....................... B44D 3/22 434/84
5,676,549 A * 10/1997 Arad ...................... G09B 11/10 434/84
7,428,994 B1 * 9/2008 Jeffway, Jr. ........... F21V 33/008 463/31
7,556,691 B2 * 7/2009 Rogers ..................... B44D 2/00 446/146
7,731,103 B2 * 6/2010 Amron .................. B05C 17/005 222/206
8,087,968 B2 * 1/2012 Amron ................ B05B 11/1001 446/15
8,956,163 B2 * 2/2015 MacFadyen ........... G09B 11/00 434/84
9,981,196 B2 * 5/2018 Kurth ..................... A63H 33/22
11,207,610 B2 * 12/2021 Rosen .................... A63H 33/22

(Continued)

*Primary Examiner* — Jethro M. Pence

(57) ABSTRACT

An apparatus for making spin art is provided. In the apparatus, a spinnable platen is conformed for removably supporting a substrate, a stroboscope is arranged for flash illumination of a substrate mounted on the spinnable platen, and at least one laser pointer is cooperatively configured with a pigment depositor such that in operation, the pointer illuminates the substrate portion that is user-selected for deposition of pigment material by the pigment depositor.

12 Claims, 8 Drawing Sheets

(56) References Cited

U.S. PATENT DOCUMENTS

| | | | | |
|---|---|---|---|---|
| 2006/0170157 | A1* | 8/2006 | Weingard | A63H 33/22 273/280 |
| 2006/0261184 | A1* | 11/2006 | Amron | B05B 11/1001 239/263 |
| 2009/0090792 | A1* | 4/2009 | Amron | B05B 11/1001 239/264 |
| 2010/0285430 | A1* | 11/2010 | Macfadyen | G09B 11/00 434/84 |
| 2011/0195382 | A1* | 8/2011 | Rudell | G09B 11/10 434/84 |
| 2012/0058269 | A1* | 3/2012 | MacFadyen | D06P 1/0016 118/52 |

* cited by examiner

STROBE SPIN ART

TECHNICAL FIELD

The present disclosure relates to mechanical devices for aiding in the production of two-dimensional artwork.

ART BACKGROUND

Historically, Spin Art was a County Fair activity staple. A spin-art device included an array of drums, each holding a motor, and a frame that could hold a pre-cut clay-coated chip-board rectangle. An operator would start the motor, allowing artists to pour paints onto the spinning rectangle from a safe distance. Spin Art appeared as a blurring disc during the creative process. Only when the spinning rectangle finally stopped, could the artist view the created work.

It was common to use volatile, industrial paints to speed the drying process, in order to offer the customer a quick-drying piece of artwork. Spin Art faced obsoletion when new environmental regulations stopped the use of volatile solvent type paints around humans. The toy industry then developed low-power spin-art toys using safe non-toxic paints, and card stock.

SUMMARY OF THE DISCLOSURE

The Strobe Spin Art apparatus provided here is a new apparatus for making traditional Spin Art. It employs precise stroboscopic illumination upon a spinning substrate held safely captive in an appropriate platen. The spinning substrate, timed to stroboscopic illumination, appears stationary to the Artist's eye during the artistic process, allowing that artist to create, observe, modify, and finish their work of art in real time. The stroboscopic illumination may be of a specific luminosity and duration.

That artistic process may use a variety of pigments, specific, e.g., to individual substrates. The apparatus may include specifically designed depositors, including deposition pattern dies, for different creative effects. Substrates may vary, and specific pigments, (e.g., paints, inks, dyes, and glazes, etc.) may also vary, depending upon the application and the substrate. The Apparatus can be used with UV— curable pigments to quickly cure the artist's finished work product into a smear-free take-home art object. A safe U.V. Interlock can be included.

Strobe Spin Art provides potential advantages, not least, in the way it makes visible the artistic process of deposition of pigments upon a rotating substrate. That is, in its use of precise synchronous stroboscopic illumination to interpolate the rotating substrate into an apparent null state of rotational moment, it can enable the artist to view the artwork being made in real time, as a static image, and not as a spinning blur.

In embodiments, the Strobe Spin Art apparatus can be programmed to time the arrival of pigment materials onto defined areas of the substrate, thus offering more precision control of deposition.

In embodiments, Strobe Spin Art can potentially accommodate a variety of pigments and paints, as well as dye stuffs, glazes, etc., deposited upon rotating substrates using a variety of depositors designed to work in conjunction, and a variety of substrates, ceramic, organic or synthetic.

In embodiments, Strobe Spin Art can be designed to illuminate across the visible spectrum, including UV portions of the spectrum for special effects.

In embodiments, Strobe Spin Art can allow the artist to view the substrate from a variety of angles, as well as in Portrait and Landscape views.

In embodiments, Strobe Spin Art can be designed to safely accommodate UV curing Inks, Dyestuffs, and Paints into the process, and to safely cure deposited materials upon selected substrates using defined spectral light, including UV light.

In embodiments, Strobe Spin Art can be programmed to time the arrival of pigments and/or dyestuffs onto defined areas of the substrate offering more precision control of deposition, and the process for making art.

DETAILED DESCRIPTION

Strobe Spin Art uses the phenomenon of stroboscopic light to make visible to the artist what happens in Spin Art when pigment impacts the substrate as it rapidly rotates in the platen.

In embodiments, the design is simple enough that assembly is feasible with basic hand tools using commercially available sub-components such as a direct or stepping electric motor, strobe lights of suitable intensity, and U.V. curing lighting of appropriate curing wavelength for the chosen U.V. curable pigments.

Figure 1:
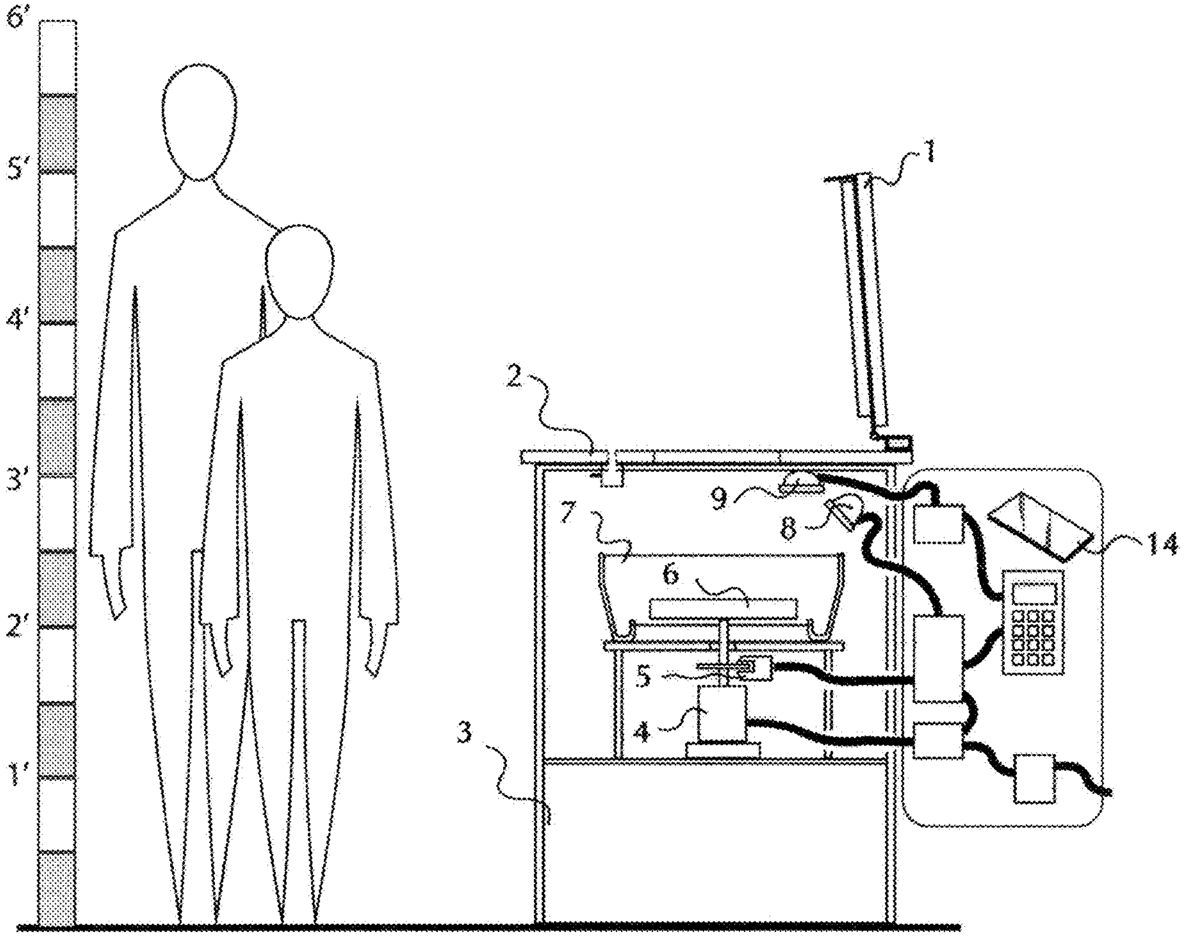
FIG. 1 is a schematic, cutaway view of a Strobe Spin Art device in an example embodiment.

FIG. 1 is a schematic, cutaway view of a Strobe Spin Art device in an example embodiment. To give a sense of scale, the outlines of two human figures are shown standing near the Strobe Spin Art device, and a vertical scale, graduated in feet, is also provided. Turning to FIG. 1, it will be seen that the example embodiment includes a safety cover 1. The safety cover may be an interlocking cover that locks in the closed position during photocuring, so that the user is protected from inadvertent radiation exposure. The example embodiment further comprises a top cover 2, having an opening that allows visual access to the spinning art beneath it. A housing 3 encloses and supports operative components that will be described below. The housing is covered by top cover 2. In operation, the spinning art is enclosed within housing 2.

Electric motor 4 is enclosed and supported within housing 3. Motor 4 may be, e.g., a direct or stepped motor. The motor is connected so that it can spin the platen that holds the artwork. In embodiments, the motor may have a variable speed, it may have a reversible rotational direction, and it may be controllable to provide a defined amount of rotational arc.

A rotational sensor mechanism 5 is mounted on or near electric motor 4. Sensor 5 is provided to sense the rotational velocity of the motor. In non-limiting examples of a suitable sensor mechanism, a sensor target is connected to the motor shaft. An electro-optical emitter-detector device, an electro-mechanical sensing device, or the like is coupled so that it can measure rotational speeds and that trigger the stroboscopic flash with each rotation.

Also enclosed and supported within housing 3 are one or more platens 6. In operation, substrate materials are mounted on the platen or platens. Although a platen will typically be round, platens may be conformed to other shapes, and they may be provided in various sizes. Sub-container 7 is also enclosed and supported within housing 3. The sub-container is conformed to catch and hold excess pigment material and the like that is expelled during the pigment-application process.

Stroboscopic ("strobe") lamp 8 is also enclosed and supported within housing 3. In operation, strobe lamp 8 emits discrete flashes of light at an adjustable repetition rate, for the purpose of creating an image of the rotating substrate that appears stationary to the user. In embodiments, it may be desirable for the strobe lamp to be operable only at flash rates well above rates that may induce seizure in humans.

Photocuring lamp 9 is also enclosed and supported within housing 3. Lamp 9 may be configured to emit curing radiation in the ultraviolet spectrum.

In FIG. 1, the supporting circuitry is shown within outline 10, which appears in the figure as external to housing 3.

Some embodiments may include a wireless remote control panel, such as control panel 14, which is shown symbolically within outline 10. In embodiments, control panel 14 may be implemented in any of various hand-held electronic communication devices, such as specially designed devices or personal communication devices that can be adapted through a software application.

Figure 2:
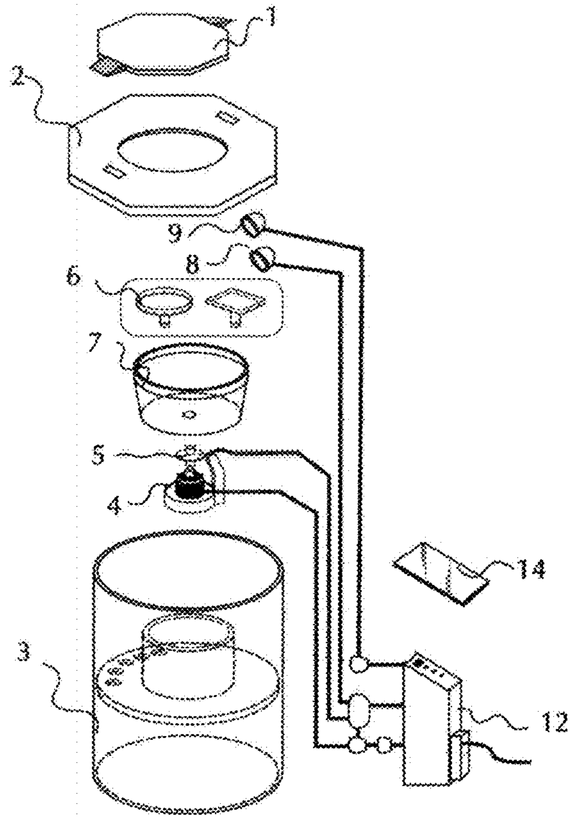
FIG. 2 shows the Strobe Spin Art device of FIG. 1 in an exploded, partial perspective view.

FIG. 2 shows the Strobe Spin Art device of FIG. 1 in an exploded, partial perspective view. Elements common to FIGS. 1 and 2 are identified with like reference numerals. In the view of FIG. 2, an inset shows two alternative conformations for platen 6. FIG. 2 also shows an attached control console 12, which may be useful in at least some embodiments.

Figure 3:
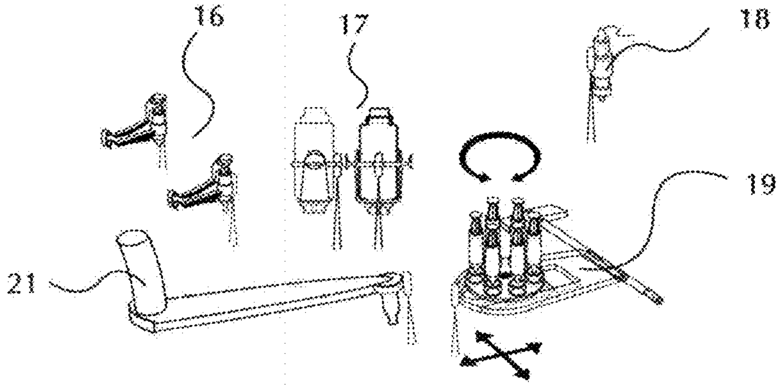
FIG. 3 provides views of several examples of depositors for pigment material, and a view of a laser pointer that can be attached to a depositor for targeting.

Any of various devices, not shown in FIG. 1, may be used for depositing paints, inks, and the like, collectively referred to here as "pigment materials", onto a substrate. Several examples are shown in FIG. 3. Turning to FIG. 3, there will be seen an example of hand depositors 16. Each hand depositor 16 may be a syringe-type depositor, and as shown, it may have an attached laser pointer for targeting. Hand depositors, among others, may be used with any of various deposition dies for creating, e.g., dots, thick sprays, and thin sprays, among other patterns.

With further reference to FIG. 3, there will be seen an example of modified commercial depositors 17, shown with attached laser pointers. The modified commercial depositors may be used with, e.g., adjustable-pattern deposition dies.

Also shown in FIG. 3 is a view of a laser pointer 18 of a type that may be attached to, e.g., depositors 16 or 17. The laser pointer may include a low-power laser for use in accurate positioning of pigment upon the substrate.

Also shown in FIG. 3 is an example of a depositor array 19, comprising a carousel of six syringe-type depositors that is aligned with an attached source of laser targeting light.

FIG. 3 also shows an example of a depositor 21 with a long-reach handle, which could be useful for individuals who would otherwise be unable to manually reach the depositors.

It is noteworthy in regard to the various depositors that in embodiments, a programmable depositor could be timed to impact a spinning substrate at a precise moment during its rotation.

Depositor containers may include, by way of non-limiting example, modified squeeze containers, mechanical depositors, and electromechanical depositors that can be timed to deposit pigment materials onto the substrate at precise times in the substrate rotation, as controlled by the control panel.

Figure 4:
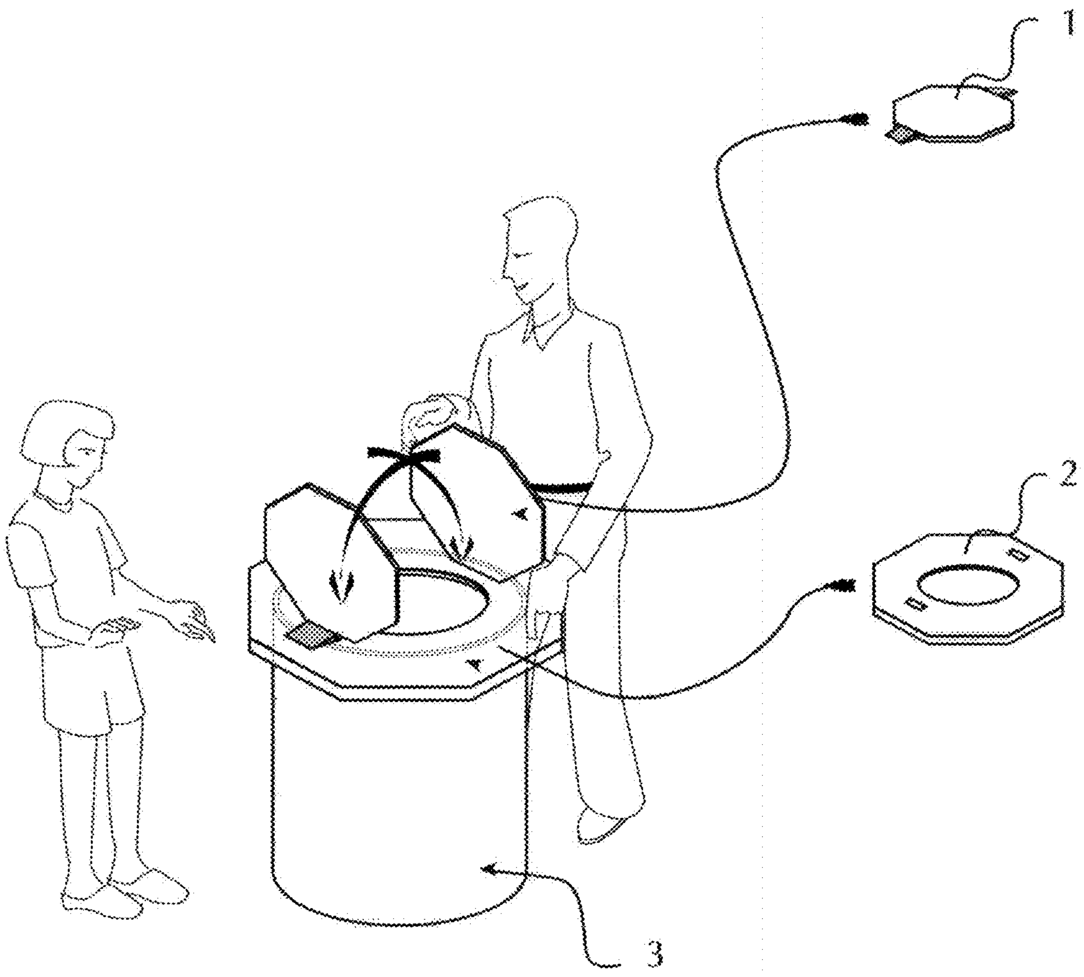
FIG. 4 provides a perspective view, with exploded details, of a safety cover being closed against a top cover of a Spin Art apparatus.

FIG. 4 provides a perspective view, with exploded details, of safety cover 1 being closed against top cover 2.

Figure 5:
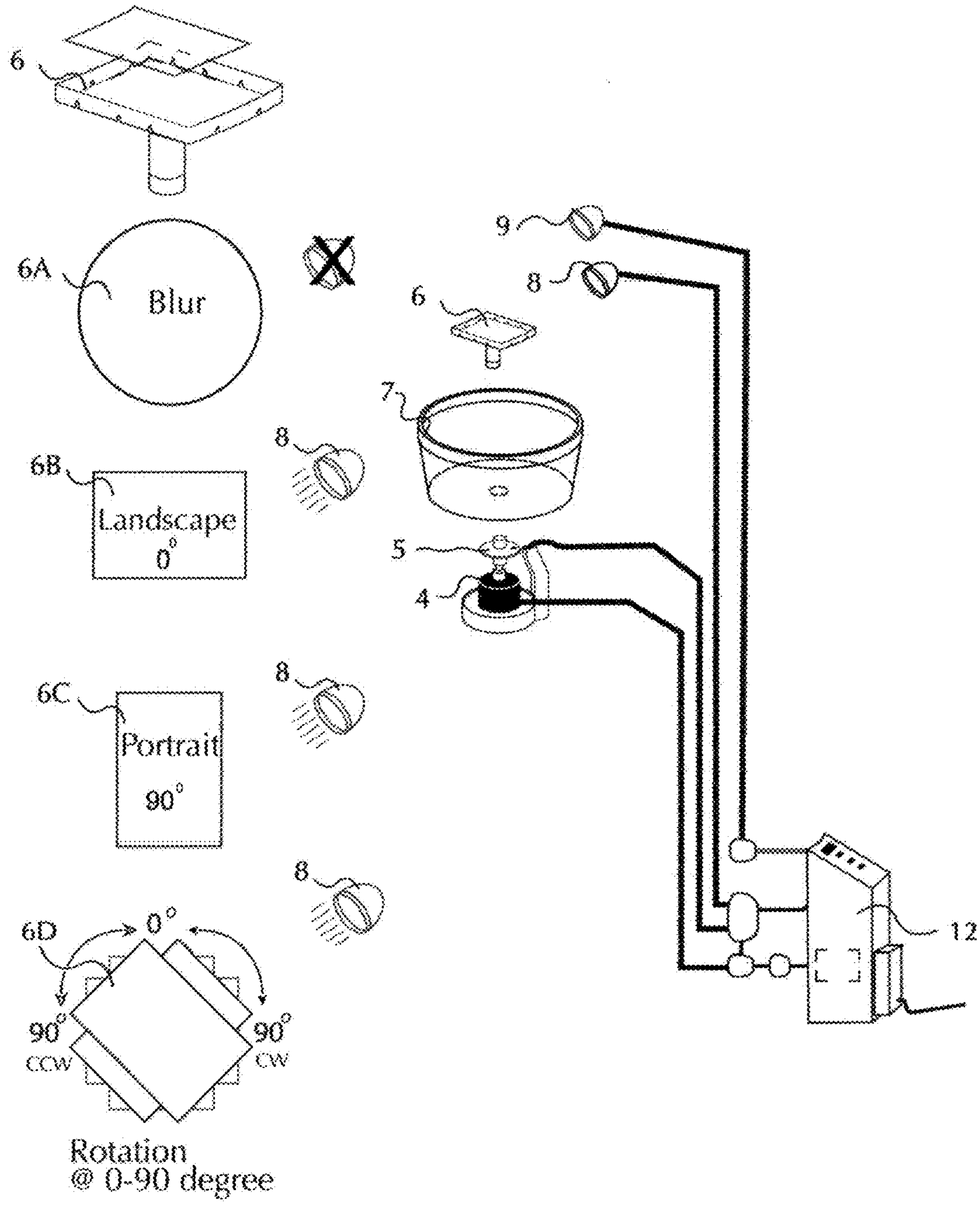
FIG. 5 provides an exploded view of a portion of a Spin Art apparatus.

FIG. 5 provides an exploded view in which the vertical alignment of platen 6 with sub-container 7, rotational sensor mechanism 5, and motor 4 can be seen more clearly than in the preceding figures. Also shown are strobe lamp 8 and photocuring lamp 9, positioned for illuminating the platen.

A detail of FIG. 5 provides an enlarged perspective view of platen 6. The detail also provides four notional plan views 6A-6D of platen 6. In view 6A, the platen is rotating, and the strobe lamp is turned off, as graphically indicated. Without stroboscopic illumination, the platen appears in rotation as a blur. Under stroboscopic illumination, may appear, for example, in landscape orientation 6B, in portrait orientation 6C, or in a different desired orientation 6D obtained by rotation through, e.g., a clockwise or counterclockwise rotation through an arc of 0-90 degrees.

Figure 6:
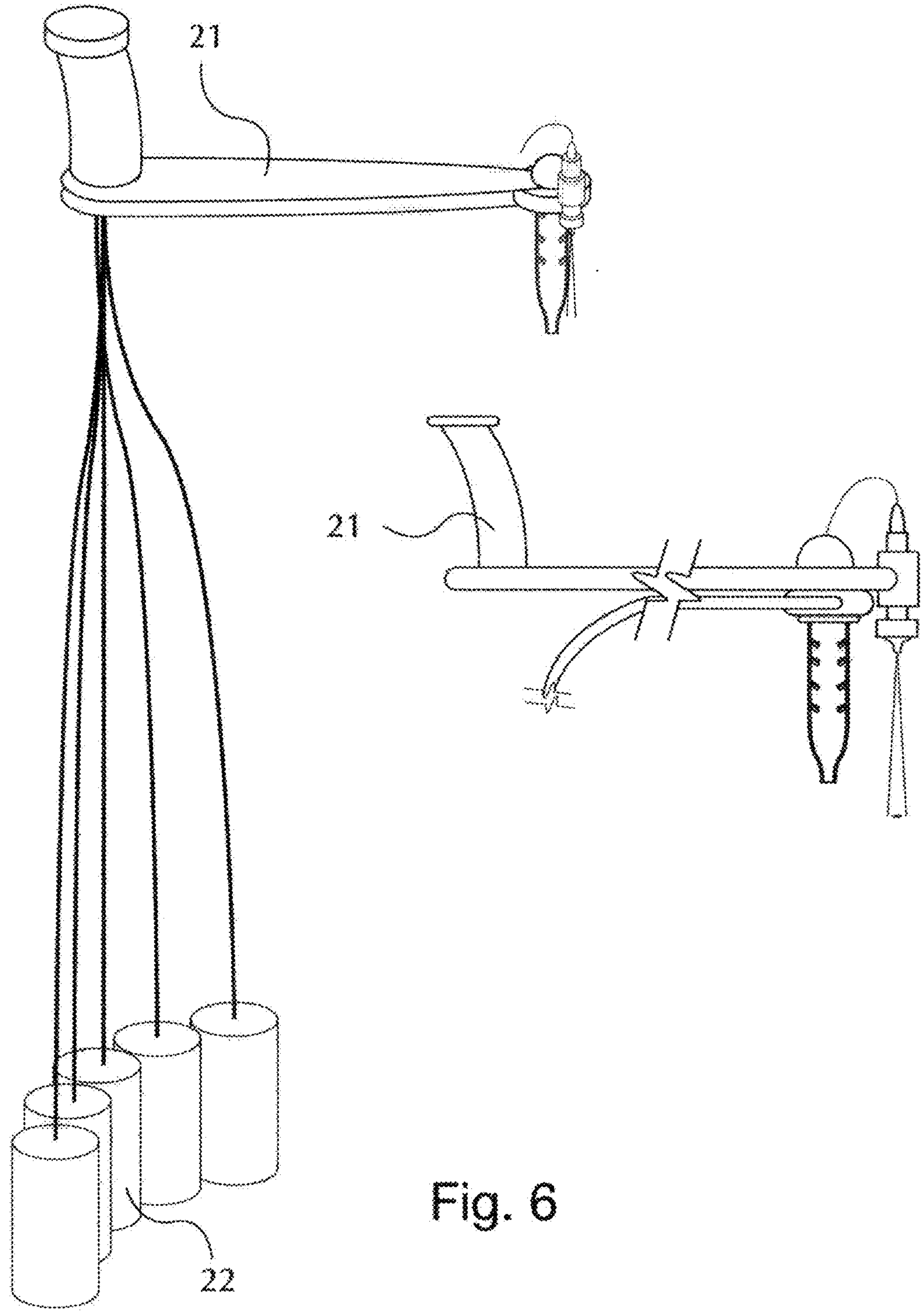
FIG. 6 illustrates a manifold depositor in full perspective view and in a partial elevational view.

FIG. 6 illustrates a manifold depositor 21 in full perspective view and in a partial elevational view. Manifold depositor 21 includes a blending wand, and it includes a reservoir 22 of pigments, to allow a variety of programmable hues, tints, shades, and tones.

Figure 7:
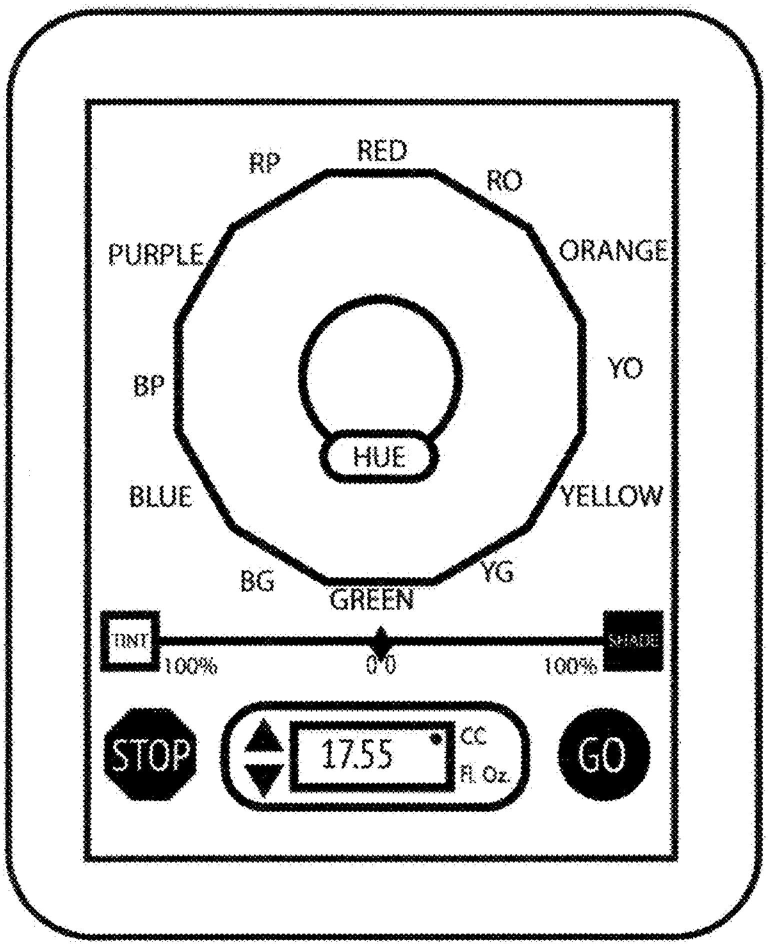
FIG. 7 provides a view of an exemplary wireless control panel that could be used in conjunction with a manifold depositor.

FIG. 7 provides a view, for purposes of illustration, of an exemplary wireless control panel 20 that could be used in conjunction with manifold depositor 21. In embodiments, such a wireless control panel could potentially allow the artist to mix and blend any number of hues, their tints, tones or shades from a reservoir of primary and secondary pigments.

Figure 8:
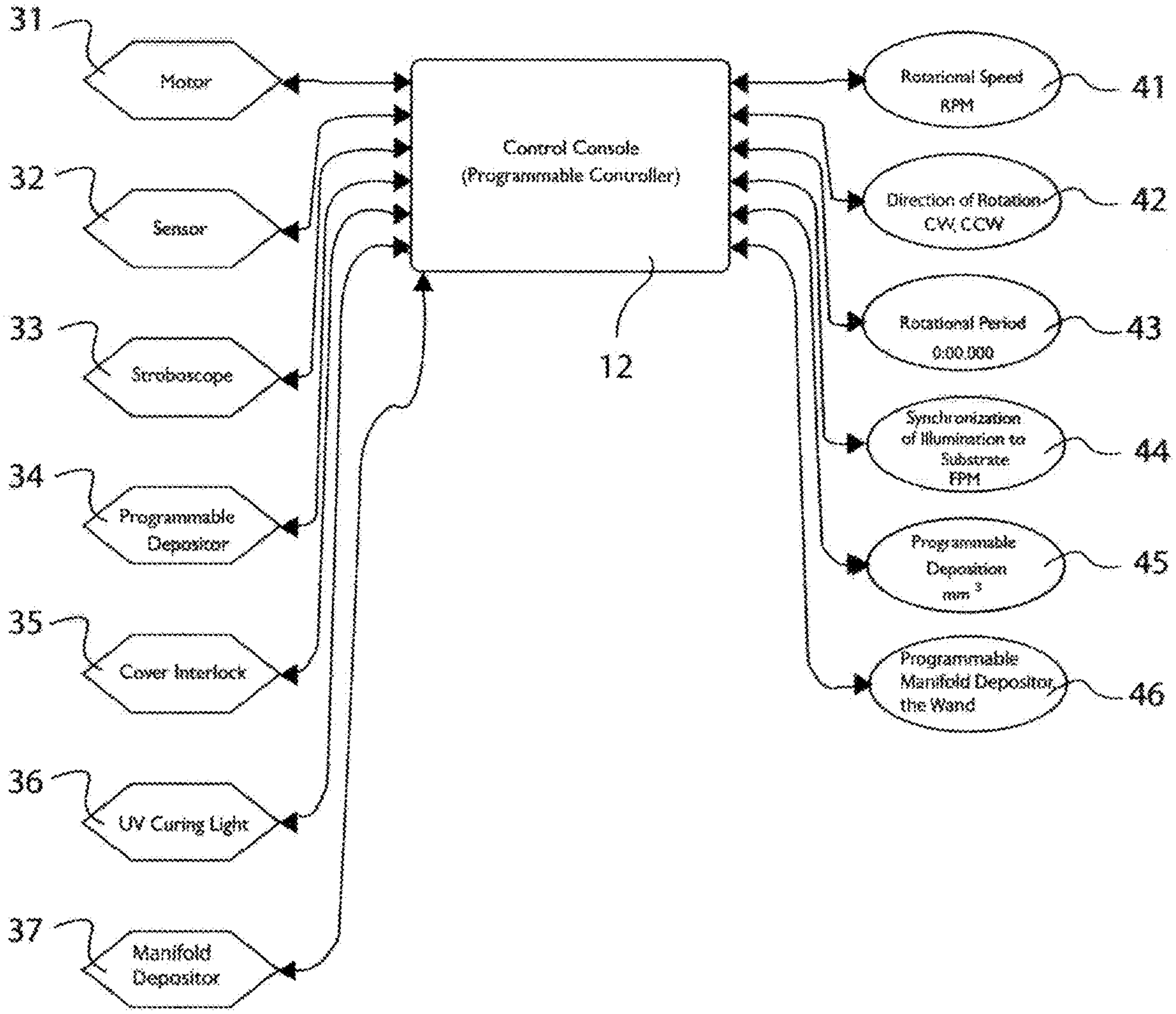
FIG. 8 provides a functional block diagram of various components that may be controlled through a control console.

FIG. 8 provides a functional block diagram of various components that, in embodiments, may be controlled through control console 12, which is connected to receive, interpret, and transmit information necessary for operating the Spin Art apparatus. As shown in FIG. 8, the functional blocks include motor block 31, sensor block 32, stroboscope block 33, programmable depositor block 34, cover interlock block 35, curing light block 36, and manifold depositor block 37. Blocks representing controllable operational parameters include rotational speed 41, rotational direction 42, rotational period 43, synchronization 44 of illumination to substrate, programmable deposition rate 45, and programmable blending 46, using, e.g., the blending wand of the manifold depositor.

Figure 9:
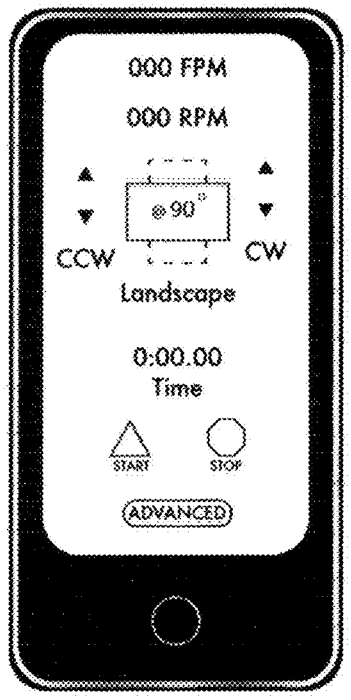
FIG. 9 provides a view of an exemplary wireless programmer control panel.

FIG. 9 provides a view, for purposes of illustration, of an exemplary wireless programmer control panel that could be implemented on, e.g., a tablet computer or a mobile phone.

Figure 10:
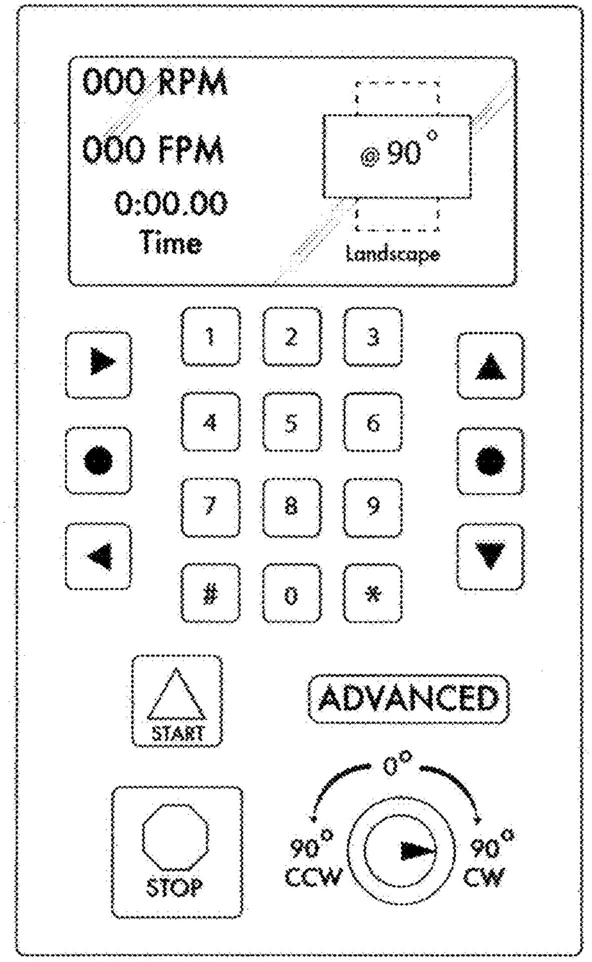
FIG. 10 provides a view of an exemplary programmer control panel that could be connected to the Spin Art apparatus via a hard-wired connection.

FIG. 10 provides a view, for purposes of illustration, of an exemplary programmer control panel that could be connected to the Spin Art apparatus via a hard-wired connection.

The motor will have to accommodate a series of platens that are designed to hold a specific type of substrates, and needs to handle the torque loads appropriate to the substrates and platen.

The component form of the apparatus places the stroboscopic illumination between the artist, and substrate so that only the substrate is illuminated.

The Control Panel is a series of electronic components that allows the artist, or operator to adjust the rotational speed, of the platen, or its viewing angle, such as Portrait, or Landscape or any 0-90 degree angle, of view.

The flash pulse rate must be extremely short duration, and of high luminosity to capture the spinning substrate, precisely, to render it static in appearance.

Strobe Spin Art allows the artist to deposit pigments in a substrate, a traditional method of creating art, only in this case the artist is depositing non-volatile pigments in a safe manner on the spinning substrate.

An Operator will assist the artist by positioning the substrate in the apparatus, operating the apparatus as the artist deposits pigments on the now spinning substrate, made viewable as still, by precisely timed stroboscopic light upon the substrate, and follows through with the U.V. curing process using prescribed safety measures to deliver a dry, smear-free work of art.

The use of safe U.V. curable pigments allow the artist to expedite the drying process associated with traditional art and spin art, but the curing process must be kept contained due to the powerful frequency of the U.V. illumination.

The Interlocking top is designed to shut down the U.V. light if accidently opened.

The platen, shown with a substrate, would appear in rotation as a blur, if not for the illumination of the stroboscopic light such that the substrate will appear in Landscape, Portrait, or in chosen arc, of 0-90 degrees, clock-wise, or counter clock-wise, in synchronous activity as controlled by the Control Console.

Again safety in the curing process is of paramount concern as U.V. lighting of sufficient frequency for curing pigments may be hazardous to human vision and must be contained within the Apparatus in a light-tight compartment of the Apparatus.

The Stroboscopic Light must provide intense even illumination of the spinning substrate, at recurring accurate intervals per rotation of the motor.

The Stroboscopic Light must be configured to trigger well above the flash rate associated with inducing Photosensitive epilepsy (PSE) when in use.

The Sensor Array should be of a non-contact design, given the rotational speeds of the Motor.

FIG. 8 shows, schematically, the Control Console, and the various components that make up the enclosed network of their electronic, electrical, mechanical, and photo-optical aspects of each individual component, and the need to program the Apparatus through a central organization module called the Control Console, that can both receive, interpret, and transmit information such that the Apparatus correctly functions, for the Artist.

Correct function for the Apparatus includes rotating a selected Substrate at a chosen rotation rate, that Substrate as if still, and in an orientation as chosen by the Artist, through the use of Synchronous Stroboscopic Illumination, allowing the Artist to observe the impact of chosen pigment(s) deposited by the artist upon the seemingly still Substrate. Then after the artistic process has been completed, the pigment that has been deposited upon the Substrate is affixed to the Substrate by means of UV illumination, changing the property of the pigment from liquid, to solid. Strobe Spin Art is an Apparatus for Making Art. It relies on components that can be programmed over a variety of programming needs, and that can communicate to the Control Console, or any hand-held electronic communication device, either individually designed to perform the specific needs of the Apparatus, or existing personal communication devices that can be adapted through an application to offer the Artist control over the artistic process, on the Strobe Spin Art Apparatus.

We see in the graphic representation of the Control Console, either hard wired to the Apparatus, (FIG. 10) or wireless (FIG. 9) the ability to control the parameters of the Apparatus for entertainment, or for true artistic purposes Depending upon the type and size of the Strobe Spin Art substrate, and platen, the Strobe Spin Art Apparatus can be scaled to spin something small in size, (approximately 5" square platen), something medium in size, (approximately 12" square platen), and something large (a t-shirt, or pillow case, approximately 18" square platen).

The invention claimed is:

1. An apparatus for making spin art, comprising:

a spinnable platen conformed for removably supporting a substrate;

a stroboscope arranged for flash illumination of the substrate mounted on the spinnable platen and having a variable flash rate;

at least one pigment depositor arranged to deposit pigment material onto a user-selected portion of the substrate mounted on the spinnable platen under user control; and at least one laser pointer cooperatively configured with the at least one pigment depositor such that in operation, the at least one laser pointer illuminates the user-selected portion that is user-selected for deposition of the pigment material by the at least one pigment depositor.

2. The apparatus of claim 1, wherein a stroboscope flash rate is tunable to a spin rate of the spinnable platen such that when the spinnable platen is spinning, a stationary image of the spinnable platen can be produced by stroboscopic illumination.

3. The apparatus of claim 2, wherein the at least one pigment depositor is programmable to synchronize deposition of the pigment material with rotation of the spinnable platen such that user-initiated release of the pigment material from the at least one pigment depositor is timed to impact the substrate during a time interval when the user-selected substrate portion has rotated into position such that the user-selected portion is illuminated by the at least one laser pointer.

4. The apparatus of claim 3, wherein the at least one laser pointer is attached to a respective at least one pigment depositor.

5. The apparatus of claim 1, wherein the stroboscope is operable only at flash rates above a threshold selected to avoid inducing seizure in humans.

6. The apparatus of claim 1, wherein spinnable platens of different sizes are interchangeable.

7. The apparatus of claim 1, further comprising a curing light source, arranged to illuminate the substrate with curing light while the substrate is mounted on the spinnable platen.

8. The apparatus of claim 1, further comprising:

an ultraviolet curing light source, arranged to illuminate the substrate with ultraviolet curing light while the substrate is mounted on the spinnable platen;

a cover that is opaque to the ultraviolet curing light and that is arranged to shield users from exposure to the ultraviolet curing light when the cover is closed; and an interlock that prevents operation of the ultraviolet curing light while the cover is open.

9. The apparatus of claim 1, further comprising:

a sensor for sensing rotation of the spinnable platen; and a circuit for synchronizing rotation of the spinnable platen to the variable flash rate of the stroboscope.

10. The apparatus of claim 1, wherein at least one said the at least one pigment depositor is electromechanically actuable.

11. The apparatus of claim 1, wherein the at least one pigment depositor is a multi-pigment wand configured to blend plural pigment materials under user control.

12. The apparatus of claim 1, wherein the at least one pigment depositor is a multi-pigment wand configured to blend plural pigment materials from a manifold of flowable pigment materials under user control.

* * * * *